United States Patent
Alsolami et al.

(10) Patent No.: US 11,247,897 B2
(45) Date of Patent: Feb. 15, 2022

(54) BASE OIL PRODUCTION VIA DRY REFORMING

(71) Applicant: Saudi Arabian Oil Company, Dhahran (SA)

(72) Inventors: Bandar H. Alsolami, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/725,565

(22) Filed: Dec. 23, 2019

(65) Prior Publication Data

US 2021/0188633 A1 Jun. 24, 2021

(51) Int. Cl.
| | |
|---|---|
| *C10G 2/00* | (2006.01) |
| *C01B 3/38* | (2006.01) |
| *C01B 3/40* | (2006.01) |
| *C25B 1/04* | (2021.01) |

(52) U.S. Cl.
CPC ............... *C01B 3/382* (2013.01); *C01B 3/40* (2013.01); *C10G 2/33* (2013.01); *C10G 2/332* (2013.01); *C10G 2/333* (2013.01); *C10G 2/341* (2013.01); *C25B 1/04* (2013.01); *C01B 2203/0238* (2013.01); *C01B 2203/0244* (2013.01); *C01B 2203/062* (2013.01); *C01B 2203/1094* (2013.01); *C01B 2203/1241* (2013.01); *C01B 2203/14* (2013.01); *C10G 2400/10* (2013.01)

(58) Field of Classification Search
None
See application file for complete search history.

(56) References Cited

U.S. PATENT DOCUMENTS

| | | | | |
|---|---|---|---|---|
| 5,068,057 | A | * | 11/1991 | Gustafson ................. C01B 3/40 252/373 |
| 5,733,839 | A | * | 3/1998 | Espinoza ............... B01J 23/745 502/336 |
| 6,293,979 | B1 | | 9/2001 | Choudhary et al. |
| 6,531,515 | B2 | | 3/2003 | Moore., Jr. et al. |
| 7,045,554 | B2 | | 5/2006 | Raje et al. |
| 7,132,042 | B2 | | 11/2006 | Genetti et al. |
| 7,642,292 | B2 | | 1/2010 | Severinsky |

(Continued)

FOREIGN PATENT DOCUMENTS

| | | |
|---|---|---|
| CA | 2938299 | 5/2015 |
| WO | WO 0238703 | 5/2002 |

(Continued)

OTHER PUBLICATIONS

PCT International Search Report and Written Opinion in International Appln. No. PCT/US2020/065932, dated Apr. 19, 2021, 14 pages.

*Primary Examiner* — Medhanit W Bahta
(74) *Attorney, Agent, or Firm* — Fish & Richardson P.C.

(57) ABSTRACT

A system and method for converting (dry reforming) natural gas (methane) and carbon dioxide via reformer catalyst in a dry reformer into syngas including carbon monoxide and hydrogen, and discharging the syngas to a Fischer-Tropsch (FT) reactor. Supplemental hydrogen is generated via water electrolysis and added to the syngas in route to the FT reactor to increase the molar ratio of hydrogen to carbon monoxide in the syngas. The syngas may be converted via FT catalyst in the FT reactor into FT waxes.

12 Claims, 3 Drawing Sheets

(56) References Cited

U.S. PATENT DOCUMENTS

| | | |
|---|---|---|
| 7,973,087 B2 | 7/2011 | Kibby et al. |
| 8,198,338 B2 | 6/2012 | Shulenberger et al. |
| 9,085,497 B2 | 7/2015 | Jennings |
| 9,242,230 B2 | 1/2016 | Moon et al. |
| 9,328,035 B1 | 5/2016 | Kuhn et al. |
| 9,676,678 B1 | 6/2017 | Agee et al. |
| 9,752,080 B2 | 9/2017 | Christensen et al. |
| 10,357,759 B2 | 7/2019 | D'Souza et al. |
| 2004/0094453 A1* | 5/2004 | Lok ............... C10M 101/02 208/19 |
| 2008/0083648 A1 | 4/2008 | Bishop et al. |
| 2009/0221723 A1* | 9/2009 | Leviness ........... B01J 19/0093 518/709 |
| 2010/0137458 A1 | 6/2010 | Erling |
| 2011/0089378 A1* | 4/2011 | Sato ................... C01B 3/40 252/373 |
| 2013/0129610 A1 | 5/2013 | Kale |
| 2017/0050845 A1 | 2/2017 | Lofberg et al. |
| 2018/0094195 A1 | 4/2018 | Lehoux et al. |
| 2019/0168206 A1* | 6/2019 | Yavuz ............... B01J 37/0203 |
| 2019/0359894 A1* | 11/2019 | Heidel ................. C01B 32/55 |

FOREIGN PATENT DOCUMENTS

| | | |
|---|---|---|
| WO | WO 2010143783 | 12/2010 |
| WO | WO 2015183200 | 12/2015 |
| WO | WO 2016207892 | 12/2016 |

\* cited by examiner

Table 1: Exemplary operating conditions for the FT reactor(s)

| Conditions | Multi-tubular fixed bed reactor |
|---|---|
| Inlet Temperature, °C | 250 to 350 |
| Pressure, bars | 20 to 30 |
| $H_2/CO$ ratio | 1.7 to 2.0 |
| Conversation, % | 60 to 70 |
| Products, wt.% | |
| C1-C4 Gas | 13 |
| C5-C11 Gasoline | 18 |
| C12-C18 Diesel | 14 |
| C19+ Waxes | 52 |
| Oxygenates | 3 |

Table 2: API Base Oil Groups

| Base Oil Group | Sulfur (%) | | Saturates (%) | Viscosity Index |
|---|---|---|---|---|
| Group 1 | >0.03 | and/or | <90 | 80-120 |
| Group II | <0.03 | and | >90 | 80-120 |
| Group III | <0.03 | and | >90 | >120 |
| Group IV | PolyAlphaOlefins (PAO) | | | |
| Group V | All other base oils not included in Groups I, II, III, or IV | | | |

FIG. 3

Table 3: Results of the dry reforming reaction

| P | T | Time | CH4 | CO2 | CO | H2 |
|---|---|---|---|---|---|---|
| 5 | 845 | 11:39 | 5.24 | 10.94 | 24.96 | 28.75 |
| 5 | 853 | 12:06 | 0 | 10.75 | 26.73 | 29.13 |
| 5 | 854 | 12:29 | 0 | 11.55 | 27.24 | 29.24 |
| 5 | 856 | 13:08 | 0 | 12.35 | 27.7 | 28.4 |
| 5 | 856 | 13:24 | 0 | 12.32 | 27.75 | 28.52 |
| 5 | 856 | 13:37 | 0 | 12.61 | 26.86 | 28.21 |

FIG. 4

BASE OIL PRODUCTION VIA DRY REFORMING

TECHNICAL FIELD

This disclosure relates to production of base oils, such as lube base oils, from natural gas and carbon dioxide.

BACKGROUND

Carbon dioxide ($CO_2$) is the primary greenhouse gas emitted through human activities. Carbon dioxide may be generated in various industrial and chemical plant facilities. At such facilities, the utilization of $CO_2$ as a feedstock may reduce $CO_2$ emissions at the facility and therefore decrease the $CO_2$ footprint of the facility. The conversion of the greenhouse gas $CO_2$ into value-added products may be beneficial.

SUMMARY

An aspect relates to a method of producing base oil. The method includes providing feed to a dry reformer vessel. The feed includes carbon dioxide and natural gas having methane. The method includes converting the methane and the carbon dioxide via reformer catalyst in the dry reformer vessel into syngas including carbon monoxide and hydrogen. The converting includes dry reforming and does not include autothermal reforming (ATR). The method includes discharging the syngas from the dry reformer vessel to a Fischer-Tropsch (FT) reactor vessel. The method also includes subjecting water to electrolysis to generate supplemental hydrogen, and adding the supplemental hydrogen to the syngas in route to the FT reactor vessel to increase a molar ratio of hydrogen to carbon monoxide in the syngas to at least 1.2. The method includes converting the syngas via FT catalyst in the FT reactor vessel into intermediate products including FT waxes.

Another aspect is a method of producing base oil. The method includes reforming methane in presence of carbon dioxide and catalyst in a dry reformer into syngas including carbon monoxide and hydrogen. The reforming does not include steam reforming and does not include ATR. The method includes discharging the syngas from the dry reformer to a FT reactor. In addition, the method includes providing supplemental hydrogen from a water electrolysis cell to a conduit conveying the syngas to the FT reactor to increase a molar ratio of hydrogen to carbon monoxide in the syngas upstream of the FT reactor. The method includes converting the syngas via FT catalyst (including a transition metal) in the FT reactor into FT reactor products including FT waxes. The method includes discharging an effluent having the FT reactor products from the FT reactor and processing the effluent to produce a base oil.

Yet another aspect relates to a base-oil production system including a dry reformer vessel having a reformer catalyst to convert, via dry reforming, a feed including carbon dioxide and natural gas into syngas including carbon monoxide and hydrogen. The dry reformer vessel has an outlet to discharge the syngas via a conduit to a FT reactor vessel operationally coupled to the dry reformer vessel. The base-oil production system includes a water electrolysis cell to generate supplemental hydrogen for addition via a control valve to the conduit conveying the syngas. Further, the base-oil production system includes the FT reactor vessel having an FT catalyst to convert the syngas into FT intermediate products including FT waxes.

Yet another aspect relates to a system for producing FT waxes, including a dry reformer vessel having a reformer catalyst to dry reform a feed including natural gas and carbon dioxide into syngas. The feed includes at least 30% carbon dioxide by volume. The dry reformer vessel has an inlet to receive the feed and an outlet to discharge the syngas via a conduit to a FT reactor vessel. The system includes a water electrolysis unit including an electrolytic cell to generate additional hydrogen to provide via a control valve to the conduit conveying the syngas. The system includes the FT reactor vessel having an FT catalyst to convert the syngas into FT reactor products including the FT waxes. The FT waxes are at least 50% by weight of the FT reactor products. The FT waxes each have at least nineteen carbons.

The details of one or more implementations are set forth in the accompanying drawings and the description below. Other features and advantages will be apparent from the description and drawings, and from the claims.

BRIEF DESCRIPTION OF DRAWINGS

FIG. 3 is a table (Table 2) of American Petroleum Institute (API) base oil groups.

FIG. 4 is table (Table 3) of results of the dry reforming reaction in the Example.

DETAILED DESCRIPTION

Some aspects of the present disclosure are directed to production of base oils, such as lube base oils (e.g., Group III), from natural gas and carbon dioxide ($CO_2$). Thus, certain implementations can utilize $CO_2$ to reduce $CO_2$ footprint.

The base-oil production system may include: (1) an upstream dry reformer, (2) an intermediate water electrolysis unit, and (3) a downstream Fischer-Tropsch (FT) system. The water electrolysis unit may include an electrolytic cell to generate hydrogen ($H_2$) from water. The FT system may include an FT reactor followed by a separation system and conversion system. The separation system and the conversion system can be considered part of or downstream of the FT system.

In operation, the dry reformer may receive the natural gas and $CO_2$. The dry reformer may generate and discharge syngas having $H_2$ and carbon monoxide (CO) to the FT reactor. The dry reformer may operate at elevated pressure to provide motive force for flow of the syngas from the dry reformer to the FT reactor. The water electrolysis unit may generate $H_2$ for addition as supplemental $H_2$ to the syngas to adjust (increase) the $H_2$/CO ratio in the syngas fed to the FT reactor for the production of base oil in the FT system.

Thus, the techniques may generate a syngas via dry reforming and water electrolysis for feed to the integrated FT reactor. The dry reforming may include reforming methane in the natural gas via the $CO_2$ without oxygen ($O_2$). The $CO_2$ may be the oxidant. The present base-oil production system may include this upstream dry reformer operationally coupled to the downstream FT reactor. As indicated, the dry reformer in implementations may operate at pressures adequate to provide pressure differential for flow of the syngas from the dry reformer to the FT reactor. As also mentioned, the water hydrolysis may generate H2 for supplemental H2 to increase the H2/CO ratio in the syngas introduced to the FT reactor. Aspects of the dry reforming were evaluated in a pilot plant, as presented in the Example below.

The present techniques may utilize a dry reforming process and water electrolysis to generate a syngas for a FT process for base oils production. Natural gas (primarily methane) and CO2 are fed to a dry reforming process. The produced syngas is mixed with an H2 stream from water electrolysis process to achieve the desired or specified H2 to CO molar ratio in the syngas. This syngas having the increased H2 is fed to a FT process to produce waxes that are then separated and converted into base oils (e.g., lube base oils, such as Group III base oils or other base oils).

Figures 1, 2:
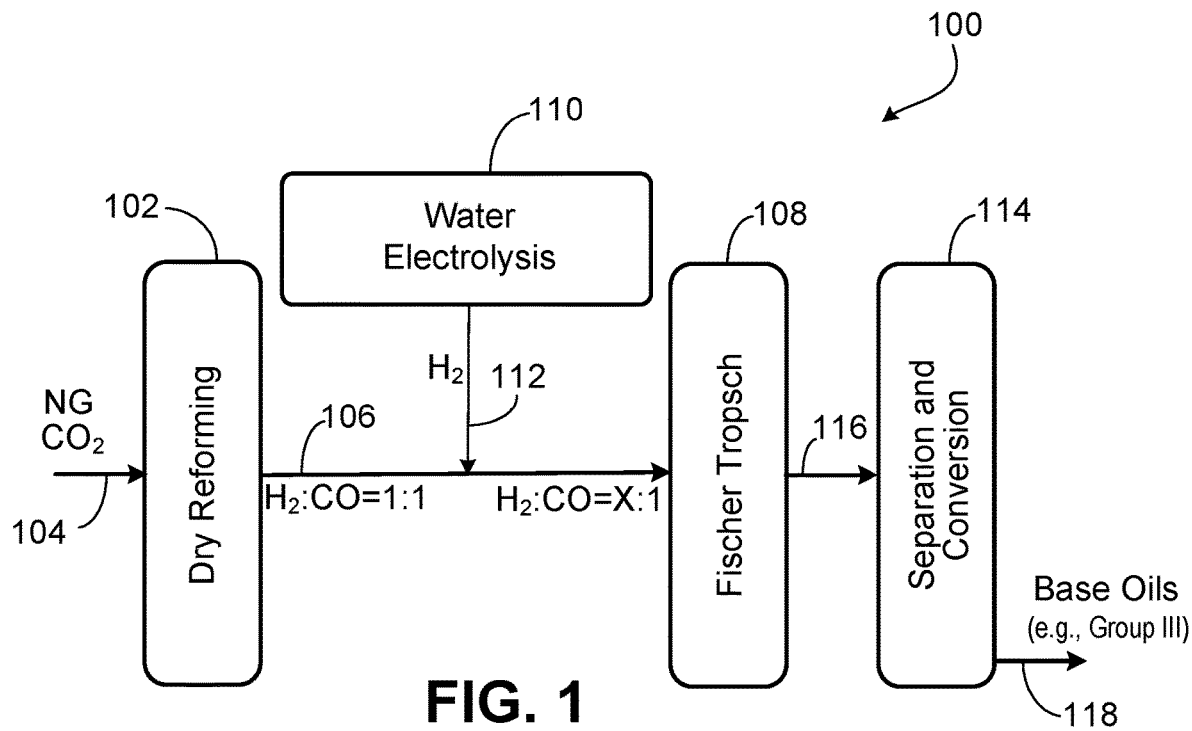
FIG. 1 is a diagram of a base-oil production system.
FIG. 2 is a table (Table 1) giving exemplary operating conditions for one implementation of Fischer-Tropsch (FT) reactor as a multi-tubular fixed bed reactor.

FIG. 1 is a base-oil production system 100 including a dry reformer 102 that may be a dry reforming reactor that is a vessel having catalyst. The vessel has one or more inlets to receive the feed 104. The inlet may be, for example, a nozzle having a flange or threaded (screwed) connection for coupling to a feed conduit conveying the feed 104 to the dry reformer 102. The vessel may have an outlet (e.g., a nozzle with a flanged or screwed connection) for the discharge of produced syngas 106 through a discharge conduit to the FT reactor 108. The catalyst may be, for example, noble metals, nickel (Ni), or Ni alloys. In some embodiments, the catalyst is magnesium oxide (MgO) or MgO nanoparticles, and which may be promoted with Ni and/or molybdenum (Mo), for example. The dry reformer 102 may be, for instance, a fixed-bed reactor or a fluidized bed reactor.

The feedstock for the dry reforming via the dry reformer 102 may generally be low economic-value streams, such as natural gas (methane) and CO2. The dry reforming may be a technique for conversion of CO2 and methane (CH4) into syngas without the introduction of steam (water). Implementations are performed without introduction of oxygen. Thus, embodiments of the dry reforming are not steam reforming, not mixed-steam CO2 reforming (MSCR), and not autothermal reforming (ATR). The produced syngas 106 typically includes CO and H2. For dry reforming, the molar ratio of H2 to CO in the syngas 106 may be about 1. The dry reforming reaction may be represented by $CO_2+CH_4 \rightarrow 2 H_2 + 2 CO$. The dry reforming (of hydrocarbons such as CH4) may also be labeled as dry reformation or carbon-dioxide reformation.

As indicated, the feed 104 to the dry reformer 102 may include natural gas and CO2. Natural gas includes primarily methane (CH4), for example, at 70-90 mole percent (mol %). Natural gas may include higher alkanes (e.g., ethane, propane, butane) and other components (e.g., nitrogen, hydrogen sulfide, etc.) at a combined concentration, for example, less than 30 mol %. In certain embodiments, the natural gas includes at least 80 mol % CH4 or at least 90 mol % CH4. The natural gas may be combined with a CO2 stream having primarily CO2 to give the feed 104. In embodiments, the natural gas may have no measurable O2 and/or measurable water (H2O), or have trace amounts of O2 and/or H2O. Natural gas generally has no more than 1 mole percent (mol %) of O2 and no more than 1 mol % of H2O.

The natural gas and the CO2 of the feed 104 may be fed in a combined stream or as separate streams to the dry reformer 102. In one implementation, the system 100 may include a static mixer to facilitate mixing of a natural gas stream with a CO2 stream (e.g., primarily CO2) to give the feed 104. In particular implementations, the system 100 may include upstream equipment (e.g., desulfurizer, pre-reformer, etc.) to process or treat the feed 104.

The flow rate (e.g., volumetric rate, mass rate, or molar rate) of the feed 104 may be controlled via at least one flow control valve (disposed along a supply conduit) or by a mechanical compressor, or a combination thereof. The ratio (e.g., molar, volumetric, or mass ratio) in the feed 104 of the natural gas (or the CH4 in the natural gas) to the CO2 may be adjusted by modulating (e.g., via one or more control valves) at least one of the flow rates of the natural gas or CO2 streams.

The CH4 content (or natural gas content) in the feed 104 may be at a volume concentration in the ranges of 30% to 70%, 40% to 60%, or 45% to 55%. Similarly, the CO2 content in the feed 104 may be at a volume concentration in the ranges of 30% to 70%, 40% to 60%, or 45% to 55%. In some embodiments, the volume concentrations in the feed 104 of the fed natural gas (or methane in the fed natural gas) and the fed CO2 are each in the range of 40% to 60% or in the range of 45% to 55%, such as about 49% to 51%, or about 50%.

The dry reforming may be a catalytic reaction where, for instance, the catalyst has an oxide support with active metal or metal sites available for the reaction. Again, the feed to the dry reforming includes CH4 and CO2. While O2 is generally not fed to the dry reformer 102, O2 is involved in the dry reforming via the dissociation of the CO2. With respect to the dry reforming mechanism, the dry reforming may disassociate CO2 into O2 and CO. A re-oxidation reaction may occur via the O2 at reduced oxide sites of the catalyst support. The oxygen from the oxide site of the catalyst support can react with CH4 to produce CO and H2 (e.g., 1 mole CO and 2 moles H2 for each mole of CH4) at the thermodynamic equilibrium ratio. The CO and H2 mixed gas may be referred to as syngas.

In certain embodiments, the dry reforming is a fixed-bed catalytic process. The dry reformer 102 may be a fixed-bed reactor that is a vessel having a fixed bed of catalyst. In one implementation, the catalyst is MgO nanoparticles promoted with Ni and Mo.

In operation for some examples, the feed 104 may be introduced into a bottom portion of the dry reformer 102 reactor and flow upward through the fixed catalyst bed in the dry reformer 102 reactor. In these examples, the syngas 106 may discharge from an upper portion of the reactor above the catalyst bed.

In operation for other examples, the feed 104 may be introduced into an upper portion of the dry reformer 102 reactor and flow downward through the fixed catalyst bed in the dry reformer 102 reactor. In these examples, the syngas 106 may discharge from a lower portion of the reactor below the catalyst bed.

The syngas 106 may be produced in the dry reformer 102 at generally the thermodynamic ratio of H2:CO of 1:1. The molar ratio of H2:CO in the syngas 106 may be in the range of 0.95:1 to 1.05:1. In implementations, the dry reforming may have a feed conversion of at least 90%. At least 90% of the feed 104 may be converted in the dry reforming by the dry reformer 102 in some embodiments.

The operating temperature of the dry reformer 102 may be, for example, in a range of 650° C. to 1000° C. or in a range of 700° C. to 900° C. The dry reforming reaction may generally be exothermic. The dry reformer 102 reactor vessel may have a jacket for heat transfer and temperature control. In operation, a heat transfer fluid may flow through the jacket for temperature control of the dry reformer 102. Heat transfer may generally occur from the dry-reforming reaction mixture (process side of the dry reformer 102 reactor vessel) to the heat transfer fluid in the jacket. Other configurations of heat transfer and temperature control of the dry reformer 102 are applicable.

The operating pressure of the dry reformer 102 may be specified to provide for a greater pressure in the dry reformer 102 than in the downstream FT reactor 108. The operating pressure may be specified to provide for an adequate pressure differential to hydraulically drive the flow of the syngas 106 from the dry reformer 102 through the piping to the FT reactor 108. The dry reformer 102 operating pressure may be specified to be greater than the downstream FT reactor 108 operating pressure by an amount to overcome the hydraulic resistance to the syngas 106 flow. The hydraulic resistance may be associated with the piping configuration, syngas 106 flow rate, syngas 106 properties, and the like. Depending on the system, the dry reformer 102 operating pressure may be specified and operated, for example, greater than the FT reactor 108 operating pressure by +5 bar, +10 bar, +15 bar, +20 bar, +50 bar, etc. The operating pressure in the dry reformer 102 may be, for example, in the range of 5 bar to 150 bar, 7 bar to 100 bar, 10 bar to 50 bar, or at least 20 bar or at least 30 bar, and so on. In some implementations, the operating pressure is at least 50 bar or at least 100 bar.

The supply pressure of the feed 104 may facilitate the operating pressure in the dry reformer 102. The header supply pressure of the natural gas, the header supply pressure of the CO2, or the header supply pressure of the mixture of the natural gas and CO2 may provide for pressure in the dry reformer 102. In some implementations, an upstream mechanical compressor associated with the feed 104 may provide for the feed 104 supply pressure and operating pressure in the dry reformer 102. In certain examples, a flow control valve may be disposed along the discharge piping conveying the syngas 106 from the dry reformer 102 to the FT reactor 108. The control valve may modulate flow rate of the syngas 106 and facilitate control of operating pressure (e.g., as a backpressure regulator) in the dry reformer 102.

In some embodiments, the operating pressure of the dry reformer 102 may be inadequate as a motive force for flow of the syngas 106 to the FT reactor 108. The operating pressure of the dry reformer 102 may be less than the operating pressure of the FT reactor 108. The operating pressure of the dry reformer 102 may less than 10 bar, less than 5 bar, less than 3 bar, or less than 2 bar. If so, a mechanical compressor may be disposed along the syngas 106 piping to provide a motive force for flow of the syngas 106 from the dry reformer 102 to the FT reactor 108.

In implementations, the syngas 106 discharged from the dry reformer 102 may generally have an approximate 1:1 molar ratio of H2:CO due to the thermodynamic equilibrium of the dry reforming. Therefore, supplemental H2 gas 112 may be added to the syngas 106. A molar ratio of the H2:CO greater than 1:1 may be beneficial to reduce or avoid coking in the FT reactor 108 and also to produce longer hydrocarbon chains for the wax production in the FT reactor 108. FT waxes are long-chain paraffin hydrocarbons each with a number of carbons, for example, in a range of 19 to 100, or 40 to 100 and higher. In order to produce these paraffins with the catalyst and operating parameters of the FT reactor 108, a H2:CO molar ratio greater than 1 is specified for the syngas fed to the FT reactor 108. In implementations, a flow control valve along the conduit conveying the supplemental H2 gas 112 may modulate the flow rate of the supplemental H2 gas 112 addition to give the desired or specified molar ratio of H2 to CO in the syngas 106 introduced into the FT reactor 108. Moreover, one or more flow control valves may modulate the flow rate of the syngas 106 upstream of the H2 gas 112 addition or downstream of the H2 gas 112 addition.

Electrolysis of water is the decomposition of water into oxygen and hydrogen gas due to the passage of an electric current. The water electrolysis unit 110 may include at least one water-electrolysis electrochemical cell (electrolytic cell) having a pair of electrodes immersed in water. An electrolyte (e.g., sulfuric acid, potassium hydroxide, sodium hydroxide, etc.) may be added to the water. The pair of electrodes are a cathode and an anode. The cathode and anode may each be an inert metal, such as platinum, stainless steel, iridium, etc. In operation, an electric current may be provided to the cathode. The electrolysis of water may receive energy to overcome activation barriers. In implementations, energy for the electrolysis of water in the water electrolysis unit 110 may be provided via renewable sources, such as energy sources relying on wind or solar.

In the electrochemical cell of the water electrolysis unit 110, reduction of the water at the cathode generates H2. Oxidation of water at the anode generates O2. The H2 and O2 may be collected separately. The overall equation of the decomposition of the water in the electrolytic cell can be: $2\ H_2O \rightarrow 2\ H_2 + O_2$. Therefore, the number of hydrogen molecules generated may be twice the number of oxygen molecules generated. The electrolysis of water via the water electrolysis unit 110 may produce H2 and O2 at a H2/O2 molar ratio of 2 to 1. The number of electrons through the water can be at least twice the number of generated hydrogen molecules and four times the number of generated oxygen molecules.

As indicated, H2 gas 112 produced from the water electrolysis unit 110 can be added to the syngas 106 to adjust the molar ratio of H2 to CO in the syngas 106. As mentioned for some implementations, a flow control valve disposed along the conduit conveying the H2 gas 112 modulates the amount of H2 gas 112 added to give the desired or specified molar ratio of H2 to CO in the syngas 106. Again, the desired molar ratio may be specified based on the FT waxes and base oil produced in the FT system. The addition of the H2 gas 112 may increase the H2:CO molar ratio, for example, to between 1.2 to 2.5, between 1.5 to 2.5, or between 1.5 to 2.2.

If needed, a hydrogen mechanical compressor can be disposed along the conduit conveying the H2 gas 112. The hydrogen compressor can provide motive force for flow (addition) of the H2 gas 112 into the conduit conveying the syngas 106.

As discussed, the base-oil production system 100 includes an FT system having the FT reactor 108. The FT reactor 108 may be a single reactor or multiple FT reactors in series and/or parallel. The FT process reactions in the FT reactor(s) 108 may be chemical reactions that convert a mixture of CO and H2 into liquid hydrocarbons. These reactions occur in the presence of metal catalysts in the reactor 108, for example, at reactor temperatures in a range of 150° C. to 300° C. and reactor pressures of 1 bar to 100 bar. The FT system also includes separation and conversion systems 114 to process the effluent 116 from the FT reactor(s) 108 to give the base oil 118 as product. In some embodiments, the separation and conversion systems 114 may be labeled downstream of the FT system and not components of the FT system but operationally coupled to the FT system.

The FT reactor 108 may convert the syngas 106 into higher molecular-weight hydrocarbons. The FT reactor 108 can include be a multi-tubular fixed-bed reactor, a slurry reactor, or a fluidized bed reactor. These types of FT reactors may be respectively utilized if multiple FT reactors 108 are employed. Moreover, heat may be removed from the FT reactor 108 because the FT process reactions are generally exothermic. Catalysts for the FT process in the FT reactor 108 may include transition metals (e.g., cobalt, iron, ruthenium, etc.) and other types of catalysts. Thus, for the FT catalytic reaction, the catalyst in the FT reactor 108 can be transition metals as active reaction sites. The catalyst may contain a promoter (e.g., copper or other promoter). Catalyst supports for the FT catalyst may be silica, alumina, or zeolites, or other supports.

For the production of FT waxes (e.g., discharged in the effluent 116), the syngas 106 fed to the reactor 108 may have an H2 to CO molar ratio of at least 1.2 or at least 1.5. In some implementations, the H2 to CO molar ratio in the syngas 106 fed to the FT reactor 108 is in a range of 1.2 to 2.5, a range of 1.5 to 2.2, or a range of 1.8 to 2.1. Converting the mixture of H2 and CO into aliphatic products in the FT reactor 108 may a multi-step reaction with several intermediate compounds. In some implementations, the catalyst in the FT reactor 108 is a cobalt-based catalyst.

The system 100 may include a control system having a processor and memory storing code (e.g., instructions, logic, etc.) executed by the processor. The control system may be or include one or more controllers. The control system may direct operation of the system 100 or aspects of the system 100. The processor may be one or more processors and each processor may have one or more cores. The hardware processor(s) may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system may include a desktop computer, laptop computer, computer server, programmable logic controller (PLC), distributed computing system (DSC), controllers, actuators, or control cards.

In operation, the control system may facilitate processes of the system 100 including to direct operation of the dry reformer 102, FT reactor 108, the water electrolysis unit 108, and so forth. The control system may receive user input or computer input that specifies the set points of control components in the system 100. The control system may determine, calculate, and specify the set point of control devices. The determination can be based at least in part on the operating conditions of the system 100 including feedback information from sensors and transmitters, and the like.

In certain implementations, the control system or controller regulates the amount of supplemental H2 gas 112 provided to the conduit conveying the syngas 106. The control system, via calculation or user-input, may direct and specify the set point of the flow control valve along the conduit conveying the H2 gas 112. In some implementations, the control system determines the set point to specify for the flow control valve correlative with feedback from the system 100. In one implementation, the control system specifies the set point of the control valve based on feedback measurements by an online gas chromatograph (GC) analyzer. For instance, the online GC analyzer may be disposed along the discharge conduit conveying the effluent 116 from the FT reactor 108. In this example, the GC analyzer may determine (measure) the composition of the effluent 116 and/or the composition of the FT waxes in the effluent 116. The control system may receive values of the composition(s) as measured by the GC analyzer and adjust the set point of the H2 flow control valve to adjust the H2 to CO molar ratio in the syngas 106 to alter the composition in the effluent 116

Referring to FIG. 1 and FIG. 2, Table 1 gives exemplary operating conditions for one implementation of the FT reactor 108 as a multi-tubular fixed bed reactor. The catalyst may be, for example, a cobalt-based catalyst or other catalysts involving, for example, iron or ruthenium. The temperature at the inlet of the reactor 108 receiving the syngas 106 is in a range of 250° C. to 350° C. In this example, the operating pressure of the FT reactor 108 is in a range of 20 bar to 30 bar. The H2/CO molar ratio in the syngas 106 received at the reactor 108 is in a range of 1.7 to 2.0. The conversion of the syngas 106 is in the range of 60% to 70%. The unreacted syngas 106 may discharge in the effluent 116. In some implementations, this residual unreacted syngas may be separated from the effluent 116 (e.g., in the separation and conversion systems 114) and recycled to the FT reactor 108. The composition of the products in the effluent are given in wt % in Table 1. The C19+ waxes are the primary product at 52 wt % of the products in the effluent 116.

In an FT synthesis process, liquid and gaseous hydrocarbons may be formed by contacting a synthesis gas (syngas) including a mixture of H2 and CO with a FT catalyst under reactive conditions at a specified temperature and pressure. The FT reaction may be conducted, for example, at temperatures in a range of about 150° C. to 400° C., or in a range of 200° C. to 350° C. The FT reaction may be conducted, for example, at pressures in ranges of about 1 bar to 40 bar, about 5 bar to 35 bar, or about 10 bar to 30 bar. The products may range from C1 to C200+ with a majority in the C5-C100 range. The reaction is typically an exothermic reaction and can be performed in different reactor types, such as fixed bed reactors (having one or more fixed catalyst beds), slurry reactors, fluidized bed reactors, etc. The FT reaction may produce relatively high molecular-weight paraffinic hydrocarbons including when utilizing a cobalt catalyst or other catalyst. FT catalysts may include one or more Group VIII catalytic metals such as iron (Fe), Ni, cobalt (Co), ruthenium (Ru), and rhenium (Re). The catalyst may contain a promoter. The FT catalyst may include an inorganic support material, such as refractory metal oxides. Support materials including alumina, silica, magnesia and titania, or mixtures thereof, may be utilized. In one example, the FT catalyst is cobalt with a titania support.

The FT system of the base-oil product system 100 also includes separation and conversion systems 114 to process the effluent 116 from the FT reactor 108 to give the base oil 118 as product. For a system 100 that does not include the separation and conversion systems 114, the system 100 may be labeled or characterized as a system for producing FT waxes in some embodiments.

Different equipment may be employed in the separation and conversion systems 114 depending, for example, on the syngas 106 composition being processed and on the particular types of base oils 118 being produced. The systems 114 for separation may include distillation columns, flash vessels, absorber columns, scrubber columns, and the like. The systems 114 for conversion may include hydrotreater vessels, hydrocracker vessels, isomerization reactor vessels, catalyst reforming vessels, alkylation reactor vessels, and the like.

In general, the FT product stream discharging in the effluent 116 from the reactor 108 may typically contains hydrocarbons having a range of numbers of carbon atoms, including gases, liquids, and waxes. Depending on the molecular weight product distribution, different FT product mixtures may be implemented for different applications and processing in the separation and conversion systems 114.

For example, FT product mixtures containing liquids may be processed to yield gasoline, as well as heavier middle distillates. Hydrocarbon waxes may be subjected to additional processing steps for conversion to liquid and/or gaseous hydrocarbons. In the production of a FT product stream for processing to a fuel, it may be desirable to obtain primarily hydrocarbons that are liquids and waxes (e.g., C5+ hydrocarbons). Initially, the light gases in raw product may be separated and sent to a gas-cleaning operation. The higher boiling product may be distilled to produce separate streams of naphtha, distillate, and wax. The naphtha stream may be first hydrotreated to produce hydrogen-saturated liquids (primarily paraffins), a portion of which may be converted by isomerization from normal paraffins to iso-paraffins to boost their octane value in some examples. Another fraction of the hydrotreated naphtha may be catalytically reformed to provide some aromatic content to (and further boost the octane value of) the final gasoline blendstock. The distillate stream may also be hydrotreated to give a finished diesel blendstock. The wax fraction may be hydrocracked into a finished distillate stream and naphtha streams that augment the hydrotreated naphtha streams sent for isomerization and for catalytic cracking. Other examples are applicable.

In some implementations, the systems 114 for separation include at least one distillation column (e.g., having trays) to separate the FT waxes from the effluent 116. Various units operations may be implemented in the systems 116 for conversion of the separated FT waxes into base oil(s). In the systems 116 for conversion, the FT waxes may be subjected to hydroconversion or hyrodtreating in a hydroconverter or hydrotreater vessel having a hydroconversion or hydrotreating catalyst. The FT waxes may be subjected to hydrocracking in a hydrocracker vessel having hydrocracking catalyst, for example, to reduce the chain length of the FT waxes. The FT waxes may be subjected to pyrolysis in a vessel or furnace that converts high-molecular-weight molecules to lower-molecular-weight molecules in the lube oil range. The FT waxes or conversion products of the FT waxes may be further subjected to hydroisomerization in an isomerization reactor vessel having isomerization catalyst, for example, to lower the pour point. The conversion products of the FT waxes may be subjected to processing in the systems 114 for separation, such as fractionation via a distillation column to isolate desired cuts or oils with specific boiling point ranges. The isolated components may be subjected to conversion processes.

FIG. 3 (Table 2) is a table of oil groups as characterized by the American Petroleum Institute (API). The API has categorized base oils into five groups, as noted in Table 2. The first three groups can be refined from petroleum crude oil. Group IV base oils are synthetic, i.e. polyalphaolefin (PAO) oils. Group V is for all other base oils not included in Groups I through IV. Before additives are added to the mixture, lubricating oils begin as one or more of these five API groups. Group III base oils are greater than 90 percent saturates, less than 0.03 percent sulfur, and have a viscosity index above 120. The viscosity index (VI) is an arbitrary unitless measure of the change of viscosity with temperature primarily utilized to characterize the viscosity-temperature behavior of lubricating oils. The lower the viscosity index, the more the viscosity is affected by changes in temperature. The VI scale was constructed by the Society of Automotive Engineers (SAE).

The production of Group III base oils are refined even more than Group II base oils and generally are severely hydrocracked (higher pressure and heat). This longer process is designed to achieve a purer base oil. Although typically made from crude oil, Group III base oils are sometimes described as synthesized hydrocarbons. Synthetic oils, which are made from Group III, are high-quality mineral oil, where the different hydrocarbon molecules are broken into shorter uniform sized molecules. Impurities such as sulfur and nitrogen are removed. Waxy compounds are subsequently removed by catalytic dewaxing and wax hydroisomerization. Typical properties of these five groups are shown in Table 2.

An embodiment is a base-oil production system. The system includes a dry reformer vessel having a reformer catalyst to convert (via dry reforming) feed including CO2 and natural gas into syngas including CO and H2. The dry reformer vessel includes an outlet to discharge the syngas via a conduit to a FT reactor vessel operationally coupled to the dry reformer vessel. The system includes a water electrolysis cell to generate supplemental hydrogen for addition via a control valve to the conduit conveying the syngas. The system includes the FT reactor vessel having an FT catalyst to convert the syngas into FT reactor products including FT waxes. The base-oil production system may include a separation system (having a distillation column) and a conversion system (having a reactor vessel) to process effluent (including the FT products) from the FT reactor vessel to produce the base oil (e.g., lube base oil). The sulfur content of the produced base oil may be than 0.03% by weight. The base oil may have a viscosity index, for example, in a range of 80 to 120, or greater than 120. The base oil may be an American Petroleum Institute (API) Group III base oil.

In implementations, the feed to the dry reformer may have: (1) less than 1% by volume of O2, wherein the dry reformer vessel is not configured to receive additional O2 in operation; and (2) less than 1 mole % of H2O, wherein the dry reformer vessel is not configured to receive additional H2O in operation. In certain implementations, the feed may include at least 30% CO2 by volume, wherein the dry reformer vessel is not configured for steam reforming, not configured for MSCR, and not configured for ATR. The system may include at least one feed conduit to convey the feed to the dry reformer vessel, where the dry reformer vessel has at least one inlet to couple to the at least one feed conduit receive the feed. The feed may include the CO2 in a range of 30% to 70% by volume. The dry reformer vessel may be a fixed-bed reactor vessel having the reformer catalyst in at least one fixed bed. The reformer catalyst may include MgO nanoparticles. The reformer catalyst may include MgO nanoparticles promoted with nickel and molybdenum. The FT reactor vessel may be a fixed-bed reactor (e.g., a multi-tubular fixed-bed reactor) having the FT catalyst in at least one fixed bed. The FT catalyst may include a transition metal, such as cobalt, iron, or ruthenium, or any combinations thereof.

Another embodiment is a system for producing FT waxes. The system includes a dry reformer vessel having a reformer catalyst to dry reform a feed including CO2 and natural gas into syngas. The feed includes at least 30% CO2 by volume. The dry reformer vessel includes at least one inlet to receive the feed and an outlet to discharge the syngas via a conduit to a FT reactor vessel. In implementations, the dry reformer vessel is: (1) not configured for steam reforming or MSCR, or to receive steam in normal operation; and (2) not configured for ATR or to receive oxygen in normal operation other than less than 1 mol % in the natural gas. In particular implementations, the reformer catalyst may include MgO nanoparticles or MgO nanoparticles promoted with Ni and Mo. The system includes a water electrolysis unit having an electrolytic cell to generate additional hydrogen to provide via a control valve to the conduit conveying the syngas. The system for producing FT waxes may include a control system to alter a set point of the control valve to adjust an amount of the additional hydrogen provided to the conduit conveying the syngas. The system for producing FT waxes includes the FT reactor vessel having an FT catalyst to convert the syngas into FT reactor products including the FT waxes. In this embodiment, the FT waxes are at least 50% by weight of the FT reactor products. The FT waxes may each have at least nineteen carbons.

Example (Dry Reforming)

A fixed-bed reactor in a pilot plant was used as a dry reforming reactor. The feed introduced was CH4, CO2, and nitrogen. Syngas was produced with a H2 to CO molar ratio of 1:1. The nitrogen gas was used to verify material balance of the system. The nitrogen gas was fed at 10 volume percent (vol %) in the feed along with the CH4 and CO2. As the nitrogen is inert and will not react, the same amount of nitrogen in the feed should discharge in the product. The nitrogen content difference between the feed and product streams was determined verify the material balance of the reactor.

The dry reforming catalyst was Ni and Mo supported on MgO. The dry reforming catalyst was activated with a mixture of H2 and nitrogen (N2) while the reactor temperature was raised to about 850° C. When the temperature stabilized at 850° C., the respective flow of CH4 and CO2 was started and then maintained at equal volume ratios to the reactor. These two respective pre-heated streams of CH4 and CO2 were combined by a simple tee fitting and the combination introduced into the fixed-bed reactor. The mixed stream was fed to the fixed-bed reactor (a vertical reactor) by downflow mode. The product gas from the fixed-bed reactor was analyzed for CH4, CO2, CO, N2 and H2.

FIG. 4 (Table 3) shows the operating conditions and product distribution of the dry reforming via the fixed-bed reactor in the pilot plant, as performed in this Example. The time given in Table 3 is clock time. Measurements started at 11:39 and ended at 13:37 for a total duration of 1 hour and 58 minutes. The pressure in the fixed-bed reactor was 5 bar. Internal stream temperature and reactor inner wall temperature were measured by thermocouples. Reactor internal stream temperature was approximately 850° C., as indicated in Table 3. The concentrations of CH4, CO2, CO, and H2 in the product gas effluent discharged from the fixed-bed reactor are given in volume percent in Table 3.

Figure 5:
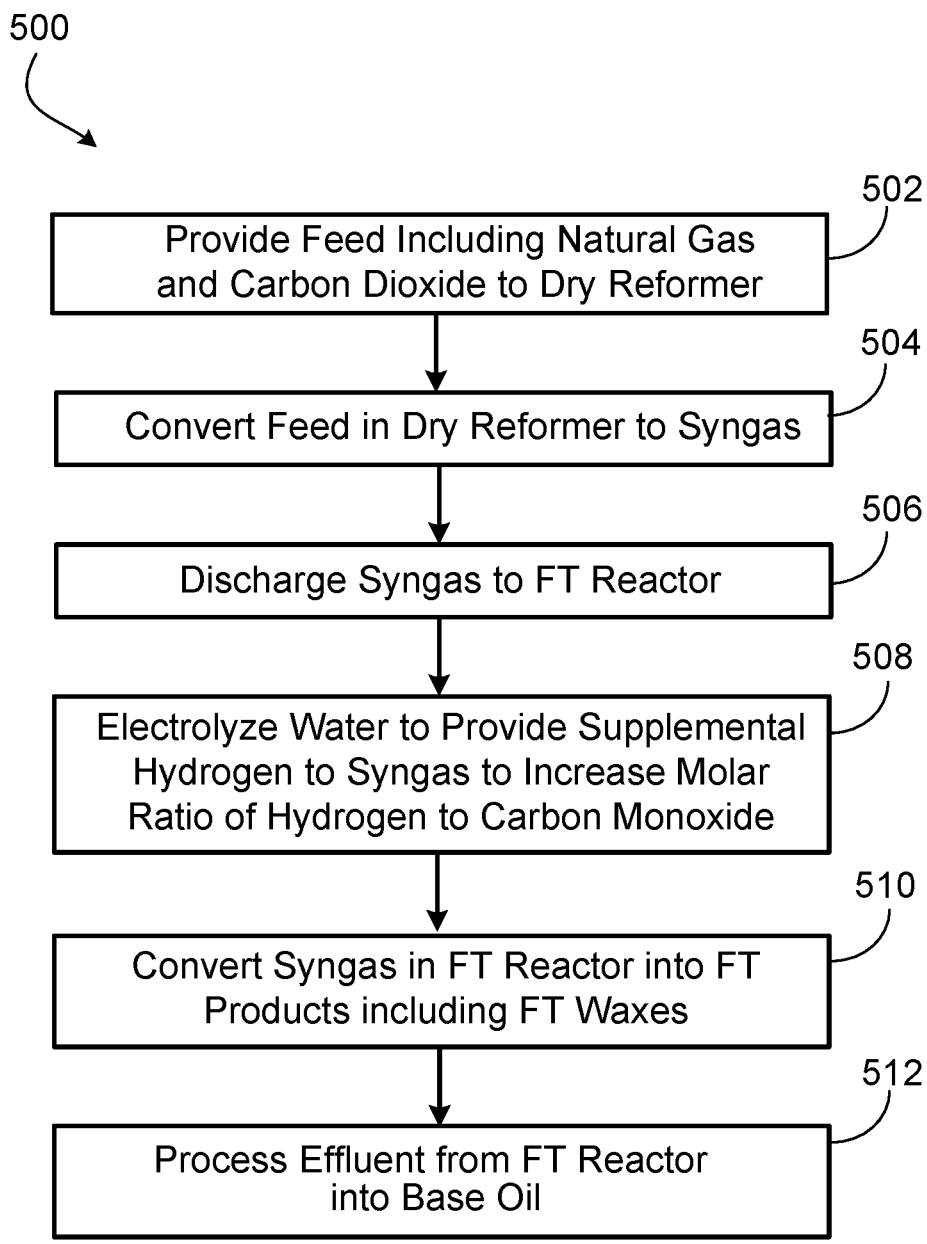
FIG. 5 is a block flow diagram of a method of producing FT waxes and base oils, such as API base oils.

FIG. 5 is method 500 of producing a base oil. The method 500 may be a method of operating a base-oil production system, such as the system 100 of FIG. 1. The base oil generated may be a lube base oil. In certain embodiments, the base oil produced has a viscosity index of at least 80 (e.g., in a range of 80 to 120) or greater than 120, and any sulfur in the base oil is less than 0.03% by weight. In some embodiments, the base oil is API Group III.

At block 502, the method includes providing a feed having natural gas and CO2 to a dry reformer. The dry reformer may be a vessel having one or more inlets to receive the feed. The natural gas received may include at least 70 mol % CH4. In examples, the feed to the dry reformer includes by volume at least 30% CO2 or at least 40% CO2. The feed may include the natural gas or the CH4 at a concentration in a range of 30% to 70% by volume. Similarly, the feed may include the CO2 at a concentration in a range of 30% to 70% by volume. In implementations, the feed generally includes no H2O and no O2, or only trace amounts of H2O or O2. In certain embodiments, the feed includes less than 1% by volume of O2, wherein additional O2 is not provided to the dry reformer vessel. The feed may include less than 1 mole % of H2O, and wherein steam or additional water are not provided to the dry reformer vessel.

At block 504, the method includes converting the CH4 and CO2 via a reformer catalyst in the dry reformer into syngas including CO and H2. The conversion may involve dry reforming the CH4 in presence of the CO2 and the catalyst. In implementations, the dry reforming reaction for the conversion may be represented by the equation: $CO_2 + CH_4 \rightarrow 2\ H_2 + 2\ CO$. In embodiments, the conversion involves dry reforming and does not involve steam reforming, MSCR, or ATR. The dry reformer may be a reactor vessel having the reformer catalyst in a fixed bed. In implementations, the dry reformer may be a fixed-bed reactor vessel (e.g., a tubular or multi-tubular fixed-bed reactor) having the reformer catalyst in at least one fixed bed. The reformer catalyst in the dry reformer may include a solid oxide support with an active metal(s) site available for reaction. In some implementations, the reformer catalyst includes MgO nanoparticles. In particular implementations, the reformer catalyst includes MgO nanoparticles promoted with Ni and Mo. The operating pressure of the dry reformer may be in a range of 650° C. to 1000° C., or in a range of 700° C. to 900° C., or at least 800° C. or at least 850° C.

At block 506, the method includes discharging the syngas from the dry reformer to a FT reactor. The syngas may be discharged from an outlet of the dry reformer vessel through a conduit to the FT reactor. In some implementations, the syngas discharged from the dry reformer has a molar ratio of H2 to CO in a range of 0.9 to 1.1, in a range 0.95 to 1.05, or in a range of 0.97 to 1.03. In certain embodiments, the operating pressure of the dry reformer is greater than an operating pressure of the FT reactor to give a pressure differential adequate as a motive force for flow of the syngas from the dry reformer to the FT reactor. In some embodiments, the operating pressure of the dry reformer is at least 15 bar, at least 20 bar, at least 25 bar, at least 30 bar, or at least 50 bar.

At block 508, the method includes electrolyzing water (e.g., subjecting water to electrolysis) to generate supplemental H2 for addition to the syngas to increase the molar ratio of H2 to CO in the syngas upstream of the FT reactor. The method includes adding the supplemental H2 to the syngas in route to the FT reactor (e.g., the supplemental H2 provided to a conduit conveying the syngas) to increase the molar ratio of hydrogen to carbon monoxide in the syngas. For example, the molar ratio of H2 to CO in the syngas may be increase via the supplemental H2 to at least 1.2 or at least 1.5, or in the range of 1.2 to 2.5 or in the range of 1.5 to 2.5.

At block 510, the method includes converting the syngas via FT catalyst in the FT reactor into intermediate products (FT reactor products or FT products) including FT waxes (e.g., paraffins). In implementations, the FT waxes may be C19+ waxes. Each FT wax molecule in the FT waxes may have at least nineteen carbons. In certain embodiments, the FT waxes may be at least 50% of the intermediate products by weight. In implementations, the FT reactor is a reactor vessel having the FT catalyst in a fixed bed. In certain embodiments, the FT catalyst includes a transition metal, such as cobalt, iron, or ruthenium, or any combinations thereof. In some examples, the FT reactor is more than one FT reactor in series or parallel, or both.

At block 512, the method includes discharging an effluent (having the intermediate products) from the FT reactor and processing the effluent to generate (produce) the base oil. For example, the processing may include separation of FT waxes from the effluent via a distillation column having distillation trays. The processing may include processing the FT waxes in a reactor vessel having catalyst, such as for hydrotreating, hydrocracking, isomerization, and the like.

A number of implementations have been described. Nevertheless, it will be understood that various modifications may be made without departing from the spirit and scope of the disclosure.

What is claimed is:

1. A method comprising:
   providing a feed to a dry reformer vessel, the feed comprising carbon dioxide and natural gas comprising methane;
   adjusting, of the feed, a ratio of the natural gas to the carbon dioxide;
   converting the methane and the carbon dioxide via a dry reformer catalyst comprising a solid oxide support in the dry reformer vessel into syngas comprising carbon monoxide and hydrogen, wherein the converting comprises dry reforming and does not comprise autothermal reforming (ATR);
   discharging the syngas from the dry reformer vessel to a Fischer-Tropsch (FT) reactor vessel comprising a fixed-bed reactor comprising FT catalyst in a fixed bed;
   subjecting water to electrolysis to generate supplemental hydrogen;
   modulating a flow rate of the supplemental hydrogen via a flow control valve along a conduit conveying the supplemental hydrogen for adding the supplemental hydrogen to the syngas in route to the FT reactor vessel to increase a molar ratio of hydrogen to carbon monoxide in the syngas to at least 1.2 as introduced to the FT reactor vessel;
   converting the syngas via the FT catalyst comprising a transition metal comprising cobalt, iron, or ruthenium, or any combinations thereof, in the FT reactor vessel into intermediate products comprising FT waxes, wherein the FT waxes are at least 50% of the intermediate products by weight;
   discharging an effluent from the FT reactor vessel, the effluent comprising the intermediate products;
   measuring composition of the effluent and adjusting an amount of the supplement hydrogen added via the flow control valve to the syngas in response to the composition as measured; and
   processing the effluent to generate a base oil.

2. The method of claim 1, wherein the reformer catalyst comprises magnesium oxide (MgO) nanoparticles or MgO nanoparticles promoted with nickel and molybdenum.

3. The method of claim 1, wherein the reformer catalyst comprises the solid oxide support with an active metal site available for reaction, and wherein an operating pressure of the dry reformer vessel is greater than an operating pressure of the FT reactor vessel to give a pressure differential adequate as a motive force for flow of the syngas from the dry reformer vessel to the FT reactor vessel.

4. The method of claim 1, wherein the FT waxes each comprise at least nineteen carbons.

5. The method of claim 1, wherein the base oil comprises an American Petroleum Institute (API) Group III base oil, and wherein the FT catalyst comprises a cobalt-based catalyst.

6. The method of claim 1, comprising combining the natural gas with the carbon dioxide to give the feed, wherein the feed comprises the natural gas or the methane at a concentration in a range of 30% to 70% by volume, and wherein the feed comprises the carbon dioxide at a concentration in a range of 30% to 70% by volume.

7. The method of claim 1, comprising combining a natural gas stream comprising the natural gas and a carbon dioxide stream comprising the carbon dioxide to give a combined stream that is the feed, wherein providing the feed to the dry reformer vessel comprises providing the combined stream to an inlet of the dry reformer vessel, wherein the feed comprises less than 1% by volume of oxygen, wherein additional oxygen is not provided to the dry reformer vessel, wherein the feed comprises less than 1 mole % of water, and wherein steam is not provided to the dry reformer vessel.

8. The method of claim 1, wherein adjusting the ratio comprises modulating, via one or more control valves, at least one of a flow rate of the natural gas or a flow rate of the carbon dioxide, wherein the dry reformer vessel comprises a fixed-bed reactor vessel.

9. The method of claim 8, wherein the dry reformer vessel comprising the fixed-bed reactor comprises the reformer catalyst in a fixed bed, and wherein the reformer catalyst comprises MgO nanoparticles.

10. The method of claim 1, wherein converting the methane and the carbon dioxide into syngas comprises performing fixed-bed catalytic reforming in the dry reformer vessel.

11. The method of claim 1, wherein measuring the composition comprises comprising measuring the composition of the effluent via an online analyzer disposed along a discharge conduit conveying the effluent from the FT reactor, and wherein the fixed-bed reactor comprises a multitubular fixed-bed reactor.

12. A method comprising:
    providing a feed to a dry reformer vessel, the feed comprising carbon dioxide and natural gas comprising methane;
    adjusting, of the feed, a ratio of the natural gas to the carbon dioxide;
    converting the methane and the carbon dioxide in the dry reformer vessel into syngas comprising carbon monoxide and hydrogen, wherein the converting comprises dry reforming and does not comprise autothermal reforming (ATR);
    discharging the syngas from the dry reformer vessel to a Fischer-Tropsch (FT) reactor vessel;
    subjecting water to electrolysis to generate supplemental hydrogen;
    adding the supplemental hydrogen to the syngas in route to the FT reactor vessel to increase a molar ratio of hydrogen to carbon monoxide in the syngas to at least 1.2;
    converting the syngas via FT catalyst comprising a transition metal in the FT reactor vessel into intermediate products comprising FT waxes;
    discharging an effluent from the FT reactor vessel, the effluent comprising the intermediate products;
    processing the effluent to generate a base oil; and
    modulating, via a control valve, a flow rate of the syngas to facilitate control of operating pressure in the dry reformer vessel, wherein the control valve is disposed along discharge piping conveying the syngas from the dry reformer vessel to the FT reactor, and wherein the adding the supplemental hydrogen increases the molar ratio of hydrogen to carbon monoxide in the syngas to in a range of 1.5 to 2.5.

* * * * *